United States Patent Office 3,442,113
Patented May 6, 1969

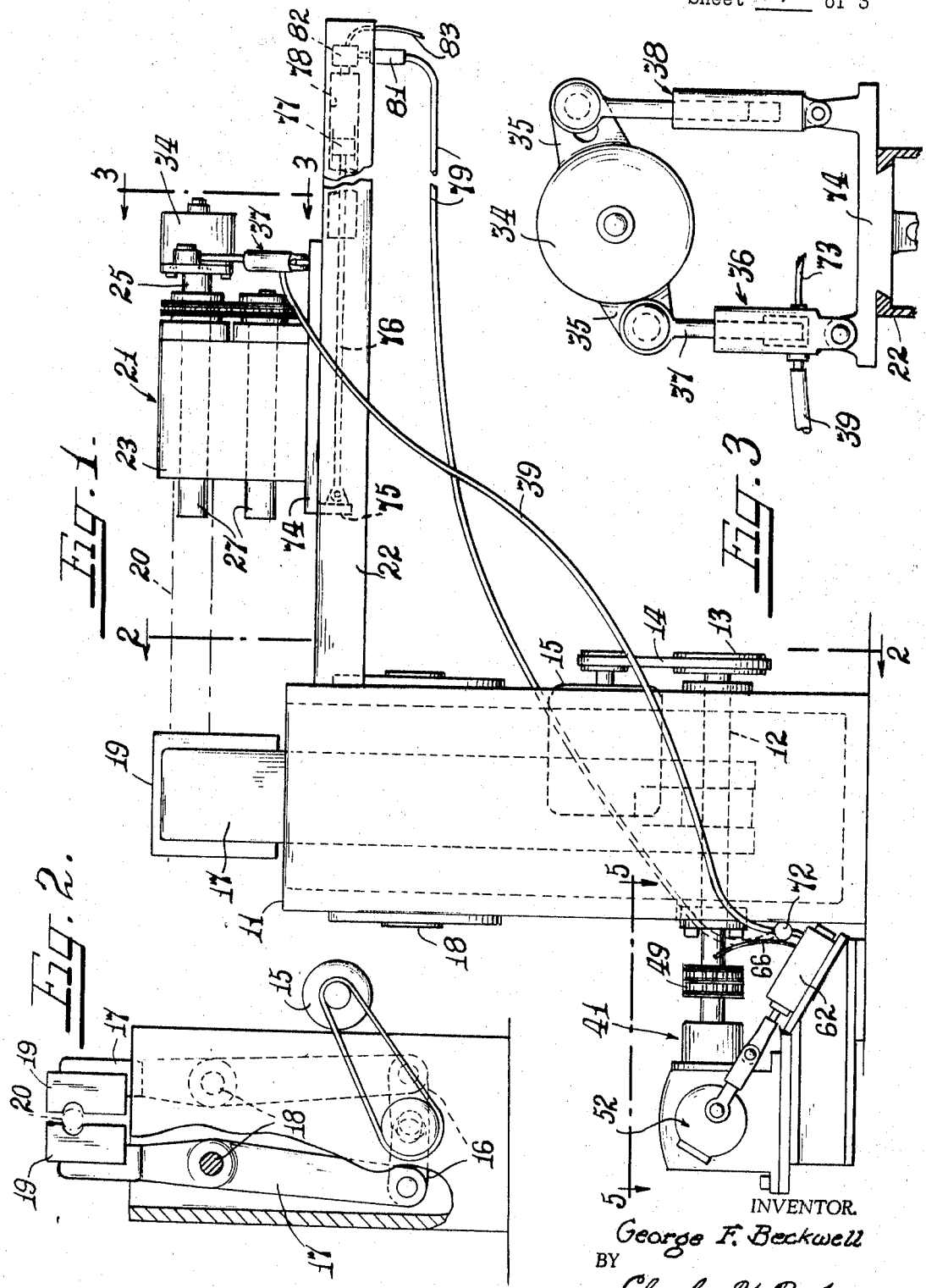

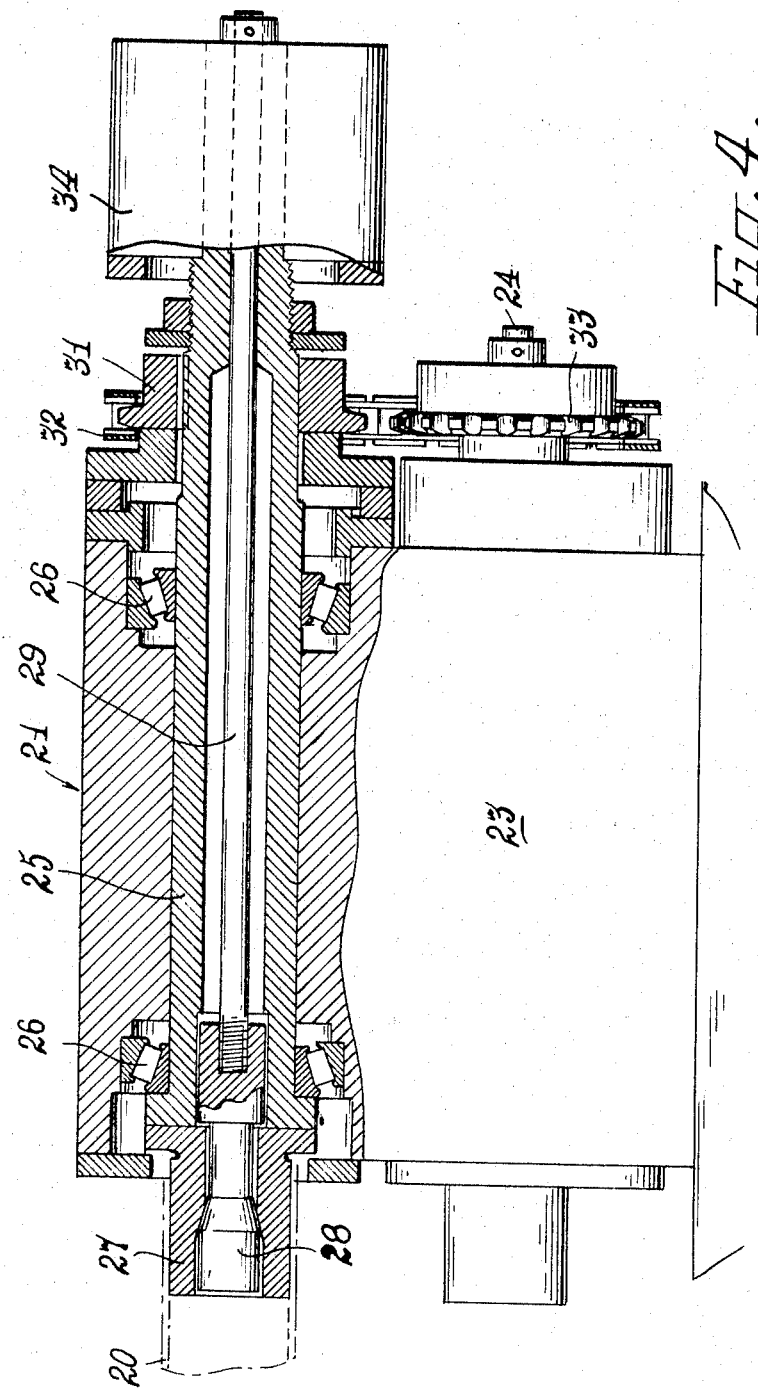

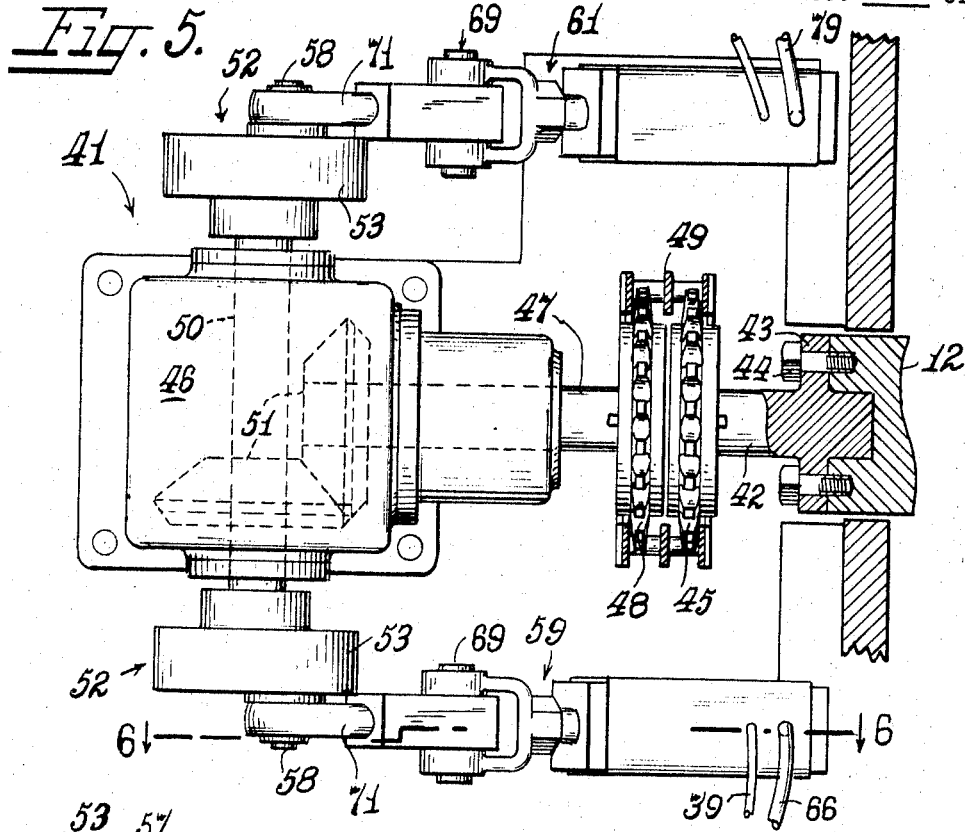
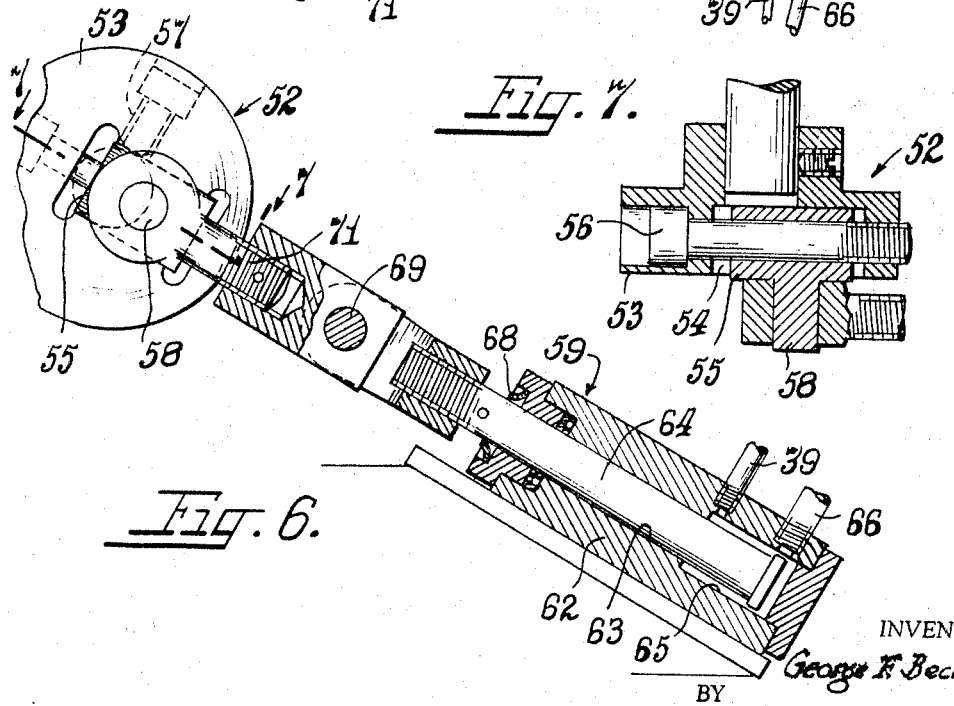

3,442,113
MATERIAL FEEDING APPARATUS
George F. Beckwell, Sugar Grove, Ill., assignor to Pines Engineering Co. Inc., Aurora, Ill., a corporation of Illinois
Filed Feb. 19, 1965, Ser. No. 434,044
Int. Cl. B21d 43/02, 43/00; F15b 7/00
U.S. Cl. 72—421
6 Claims

ABSTRACT OF THE DISCLOSURE

Apparatus for forming tubular stock and including means for incrementally advancing a workpiece toward means to perform work thereon and for incrementally rotating said workpiece during its advance.

---

The present invention relates to improvements in tube forming machines and is particularly concerned with novel material feeding apparatus for intermittently feeding and rotating a workpiece during a forming operation.

A machine of the general character to which the invention is particularly adapted to be associated with is shown in my co-pending application Ser. No. 307,711, filed Sept. 9, 1963, now patent No. 3,277,690. Such machine includes a pair of die block components between which a workpiece, such as a length of tubular stock, is located. The die block components are carried on the upper ends of a pair of opposed arms, the lower ends of which are connected to a driven eccentric shaft and they are oscillatably rocked at a high speed to cause the die block components to repeatedly strike the workpiece, and thereby hammer or compress the workpiece into a desired configuration. In such machines it is essential to rotate the workpiece in order to insure uniformity of the configuration throughout the circumferential surface thereof. Obviously, the workpiece cannot be continuously rotated because of the intervals when it is clamped firmly between the die block components during a hammering cycle. Accordingly, the present invention is concerned specifically with the provision of novel means to impart high speed step-by-step rotation to the workpiece and wherein the means for accomplishing this is co-ordinated with the drive for the arms so that rotational movement occurs only when the die blocks are out of contact with the workpiece.

In some instances of use it is necessary also to advance the workpiece endwise between the die block components during the forming operation. This movement also is co-ordinated with the die block component driving means.

It is therefore an object of the invention to provide novel means for imparting intermittent rotation to a workpiece during a forming operation.

Another object is to provide novel means for operably connecting control means for rotating mechanism, which means is co-ordinated with a power source so as to function at selected intervals during opreation of said power source.

Another object is to provide novel hydraulic flow control mechanism.

Another object is to provide novel means for causing a workpiece to be incrementally advanced between forming dies.

Another object of the inventon is to provide control mechanism of the character described which is not too expensive to manufacture, is simple in its construction and assembly, is inexpensive to operate, positive in operation and very efficient in use.

The structure by means of which the above noted and other advantages of the invention are attained will be described in the following specification, taken in conjunction with the accompanying drawings, showing preferred illustrative embodiments of the invention, in which:

FIG. 1 is a side elevational view of a forming machine and work piece holding means, embodying the features of the invention.

FIG. 2 is an end elevational view, on a reduced scale, of the forming apparatus, taken substantially along line 2—2 of FIG. 1.

FIG. 3 is an end elevational view of the centrifugal clutch and the rotating mechanism as viewed along line 3—3 of FIG. 1.

FIG. 4 is an enlarged side elevational view of the work feeding mandrel assembly, showing it partly in central section.

FIG. 5 is a horizontal sectional view taken on line 5—5 of FIG. 1, showing the pump control mechanism in elevation.

FIG. 6 is an enlarged sectional view of one of the pumps, taken substantially on line 6—6 of FIG. 5.

FIG. 7 is a detail sectional view taken on line 7—7 of FIG. 6.

Referring to the accompanying drawings which illustrate an exemplary embodiment of the invention, the forming machine illustrated includes a housing structure 11 in which is journalled at the lower end thereof, an eccentric shaft 12 that extends to the outside of one end thereof and mounts a pulley 13 over which is trained a belt 14 for drivingly connecting said shaft with a power source, such as motor 15. A pair of pitmans 16 are connected to said drive shaft and one is connected to the lower end of each of a pair of rocker arms 17. The rocker arms are pivotally mounted in the housing, as at 18, and the upper end of each mounts a die block component 19. These die block components are shaped to embrace and form a length of tubular stock 20 into a desired configuration, such as by tapering same or otherwise reducing its diameter.

Operation of the machine, insofar as it has been described, is such that during continuous rotation of shaft 12, the rocker arms 17 are oscillatably rotated or vibrated short strokes so as to cause the die block components 19 to move at high velocity toward and away from one another to intermittently apply pressure on a length of tubular stock 20 extended therebetween. As noted hereinabove, in order to obtain uniformity in the formed tubular stock, it is essential that the work piece be rotated during operation of the apparatus. Obviously, such rotation is impossible during the intervals when the die block components are pressed firmly against the workpiece. Consequently, means now to be described is provided to rotate the work piece only during the interval when the die block components are out of contact with the workpiece.

Referring again to FIG. 1, the workpiece 20 is mounted on a work holder 21 that is slidable along a carriage frame 22 which extends outwardly from one end of housing 11. The work holder, best shown in FIG. 4, comprises a casing 23 which, in this instance, contains two spindles 24, 25 which are substantially of like construction and hence only one is shown in use and in detail. The casing 23 is longitudinally bored to receive the rotatable spindle 25 therethrough. This spindle is journalled in anti-friction bearings 26 and it carries on one of its ends a mandrel 27 over which one end of the tubular workpiece 20 is fitted snuggly. The mandrel is secured to the spindle by means of a central plug 28 having screw connection with a rod 29 that extends through the spindle. This form of connection affords a simple structure permitting ready substitution of one size mandrel 27 for another to accommodate differently sized tubular workpieces.

The other spindle end carries a sprocket 31 over which a chain 32 is trained for drivingly connecting the spindle 25 with the companion spindle 24 through sprocket 33 carried on spindle 24. Also mounted on the end of spindle 25 is a centrifugal clutch 34 having a pair of diametrically opposed radial arms 35 (FIG. 3) intergrally connected with its shell. This clutch may be of any standard construction but preferably is of a type commercially known as a "Rawson" clutch, manufactured by the Formsprag Company of Warren, Mich. Because its construction is well known it is not described herein in detail. As is well understood this clutch operates to rotate the spindle or spindles when its shell is rotated in one direction and to slip independently of said spindle when rotated in the opposite direction. Its purpose is to impart intermittent rotation in one direction to spindle 25 and its mandrel 27 and to the companion spindle 24 and its mandrel, at relatively high speeds.

Operation of the clutch is effected, in this instance, by a hydraulic piston-cylinder assembly 36 (FIG. 3) having its piston rod 37 connected to one of said radial arms 35. The other radial arm 35 is connected to a dash pot 38 that functions to return the arms to their initial positions after having been displaced by operation of the hydraulic piston-cylinder assembly 36. Obviously, spring means may replace the dash pot shown. Hydraulic pressure is intermittently supplied to piston-cylinder assembly 36 through a conduit 39 in a manner and by means now to be described.

Referring now to FIGS. 1 and 5 through 7, the hydraulic pressure generating means, generally indicated at 41, is driven through direct connection with eccentric drive shaft 12. The drive includes a flanged stud shaft 42 that has its flange 43 bolted directly onto the end of shaft 12, as by bolts 44. This stud shaft carries a sprocket 45. A reduction gear box 46 is arranged adjacent to said stud shaft with its drive shaft 47 in end-to-end axial alignment therewith. This shaft 47 also mounts firmly, a sprocket 48 disposed in substantial face to face contact with sprocket 45. A chain 49 is trained over both sprockets to provide a drive connection between stud shaft 42 and drive shaft 47. This sprocket-chain drive is provided to afford co-ordination of the operation of the hydraulic pressure generating means with operation of rocker arms 17 as is more fully explained hereinafter.

The reduction gear box 46 has a transverse shaft 50 projecting out of each end thereof and which is driven by shaft 47 through gears 51. Each end of shaft 50 mounts a like eccentric assembly 52 which, as best shown in FIG. 7, is comprised of a disc 53 diametrically slotted on one face, as at 54, to receive a block 55 slidable on a guide rod 56. The block 55 is secured in any position of adjustment along said guide rod by a set screw 57. The slide block 55 has a bearing pintle 58 projecting outwardly therefrom. These bearing pintles provide eccentric pivots to which the bearing end of pump assemblies 59–61 respectively, are connected. These pump assemblies are alike and one, for example the assembly 59, is connected to the hydraulic piston-cylinder assembly 36, whereas the pump assembly 61 is connected to means to be described presently for advancing the work holder 21 toward the die block components.

The pump assembly 59, best shown in FIG. 6, comprises a housing 62 having a bore 63 therein in which a plunger 64 operates. This bore has an enlarged diameter, as at 65, with which a hydraulic fluid supply line 66 leading from a suitable fluid supply source and the conduit 39 connected to the hydraulic piston-cylinder assembly 36, are connected. As shown, the plunger is surrounded by a wiper gland 68 where it emerges from housing 62 and it has a pivotal connection at 69 with a bearing member 71 that is mounted on pintle 58. It should be evident that as the plunger 64 is reciprocated, in response to driving of shaft 50 and rotation of eccentric pintle 58, fluid is intermittently pumped through conduit 39 to the hydraulic piston-cylinder assembly 36 for actuating the formsprag clutch 34. A check valve 72 is provided in conduit 39 to prevent reverse flow of fluid and a return flow or bleed line 73 (FIG. 3) connects the hydraulic piston-cylinder assembly 36 with the supply source.

Pump operation is extremely fast and is co-ordinated with the reciprocable operation of the die block components 19 so as to rotate the work piece 20 only when pressure of said components on the workpiece is relieved. Such timing is effected by adjustment of the relative positions of the sprockets 45 and 48, and the stroke of the pump plunger 64 is independently controlled by adjustment of slide blocks 55.

As noted hereinabove, the other pump assembly 61 is connected in flow communication (FIG. 1) with the means provided to advance the work holder 21 toward the machine in small increments. This is best accomplished by mounting the work holder on a carriage 74 slidable along carriage frame 22. The carriage 74 is connected, as at 75, to one end of a piston rod 76 having its piston 77 operating in a cylinder 78 to which one end of a conduit 79 is connected. The other end of said conduit is connected to the pump assembly 61. In operation, each time the pump assembly 61 is actuated, the piston 77 advances a very short distance. Pressure on the piston is maintained by providing a check valve 81 in conduit 79. After having been advanced the maximum distance required, a bleed valve 82 functions to allow the fluid in cylinder 78 to return to supply through a return line 83.

It should be evident at this time that the workpiece 20 is incrementally rotated at a speed corresponding to the speed of operation of the die block components and only while said die block components are out of contact with the workpiece, and that rotation is of such rapidity as to appear to be continuously rotating during machine operation. It might be noted that the provision of two spindles 24 and 25 on the work holder affords means for working two tubular workpieces at one time in which event, of course, the die block components have dual forming faces thereon.

Although I have described a preferred embodiment of the invention in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What I claim and desire to secure by Letters Patent of the United States is:

1. In apparatus of the character described, a pair of oscillatably rockable arms, means operable to rock said arms, a die-block component carried by each arm adapted to intermittently engage with and perform work on a workpiece advanced therebetween, a workpiece holder including a spindle, a mandrel on said spindle, on which the workpiece is mounted, means including a centrifugal friction clutch to rotate the spindle when the die blocks are out of engagement with the workpiece, said means comprising a hydraulically actuated piston connected to and operable to actuate said clutch, and a hydraulic pump operably connected to said arm rocking means.

2. In apparatus of the character described, a pair of oscillatably rockable arms, means operable to rock said arms, a die-block component carried by each arm adapted to intermittently engage with and perform work on a workpiece advanced therebetween, a workpiece holder including a spindle, a mandrel on said spindle on which the workpiece is mounted, means to rotate the spindle in one direction when the die-block components are out of engagement with the workpiece, said means comprising a hydraulically actuated piston connected to and operable to actuate said rotating means, and a hydraulic pump operably connected to said arm rocking means.

3. In an apparatus of the character described, a pair of oscillatably rockable arms having die-block components thereon, means to actuate said arms, a work holder including a spindle, hydraulically actuated means to incrementally advance the work holder toward the die-block arms during operation of the apparatus, and hydraulically actuated means operable to incrementally rotate the spindle in unison with rocking of said arms.

4. In apparatus of the character described including means to perform work on a workpiece fed thereto, a spindle for mounting the workpiece and for advancing said workpiece toward the work performing means, a centrifugal friction clutch on said spindle, a pair of radially extending diametrically opposed arms on said clutch, a piston-cylinder assembly operably connected to one of said arms, a dash-pot connected to the other arm, and means to intermittently admit hydraulic pressure into the piston-cylinder assembly for actuating said clutch to intermittently rotate the spindle in one direction.

5. In apparatus of the character described including means to perform work on a workpiece fed thereto, a spindle for mounting the workpiece and for advancing said workpiece toward the work performing means, a one-way clutch on said splindle, a pair of radially extending arms on said clutch, a piston-cylinder assembly operably connected to one of said arms, a dash-pot connected to the other arm, and means to intermittently admit hydraulic pressure into the piston-cylinder assembly for actuating said clutch to intermittently rotate the spindle in one direction.

6. In apparatus of the character described including means to perform work on a workpiece fed thereto, a spindle for mounting the workpiece and for advancing said workpiece toward the work performing means, a one-way clutch on said spindle, a pair of radially extending arms on said clutch, a piston-cylinder assembly operably connected to one of said arms, and means to intermittently admit hydraulic pressure into the piston-cylinder assembly for actuating said clutch to intermittently rotate the spindle in one direction.

References Cited

UNITED STATES PATENTS

| | | | |
|---|---|---|---|
| 383,142 | 5/1888 | Nobs | 72—421 |
| 2,203,956 | 6/1940 | Gettig | 72—421 |
| 2,347,875 | 5/1944 | Bratz | 72—421 |
| 2,410,742 | 11/1946 | Newall | 72—425 |
| 3,167,935 | 2/1965 | Fawick | 64—19 |

FOREIGN PATENTS 524,109    4/1955    Italy.

CHARLES W. LANHAM, *Primary Examiner.*

G. P. CROSBY, *Assistant Examiner.*

U.S. Cl. X.R.

72—407, 425; 60—54.5; 74—111